April 22, 1941.    A. C. WAINE ET AL    2,239,263
EXAMINATION OF TRANSPARENT SOLID MATERIALS
Filed Jan. 10, 1939
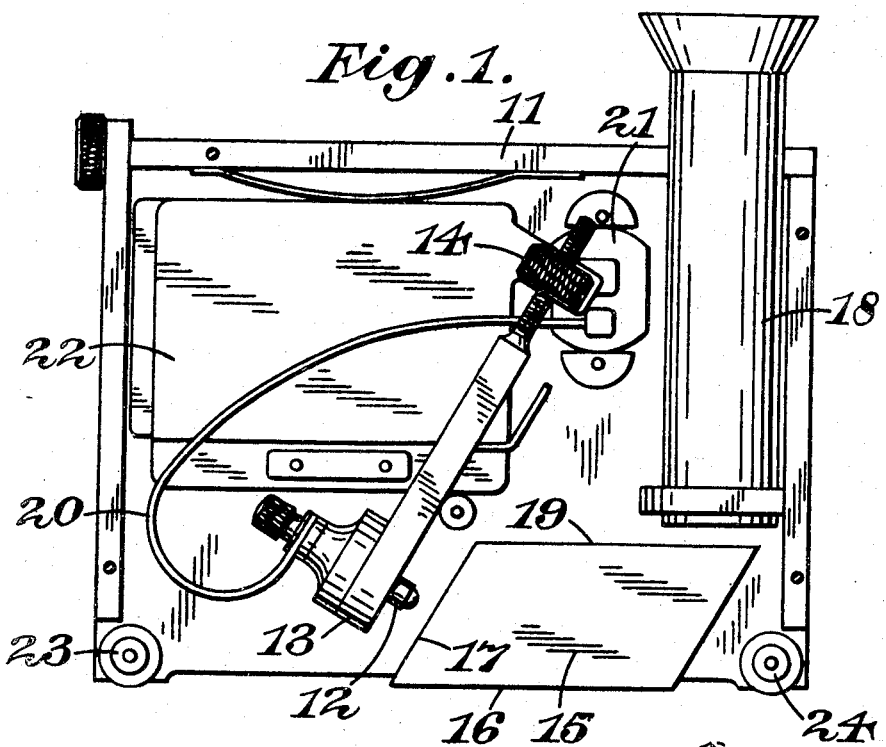
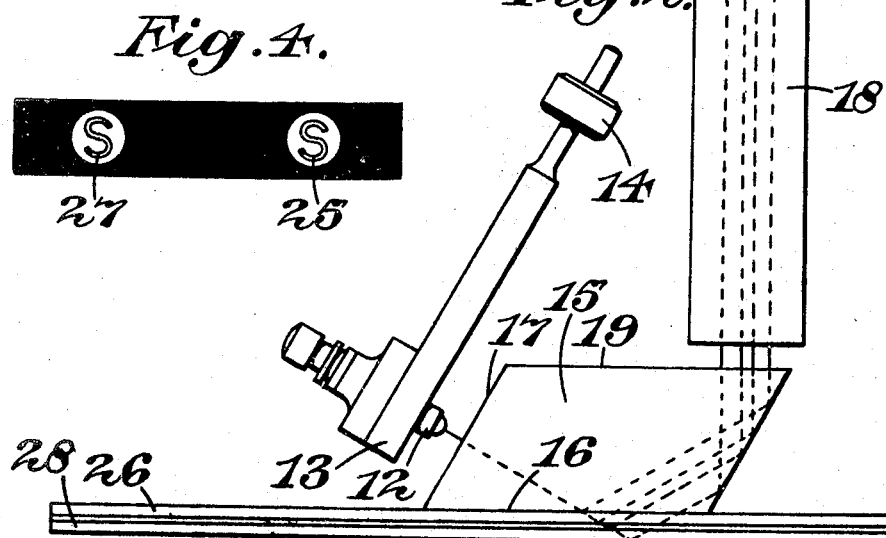

UNITED STATES PATENT OFFICE 2,239,263

EXAMINATION OF TRANSPARENT SOLID MATERIALS

Allan Coley Waine and Fazul Din, King's Norton, Birmingham, England, assignors to The Triplex Safety Glass Company Limited, London, England, a British company Application January 10, 1939, Serial No. 250,228
In Great Britain January 24, 1938

13 Claims. (Cl. 88—14)

This invention is for improvements in or relating to the examination of transparent solid materials and has particular reference to the examination of sheets or blocks of such material.

It is often difficult to determine by inspection if a transparent material such as glass is homogeneous or is built up of a series of laminations. In certain cases it is desirable to obtain this information readily, as for example in determining whether a windscreen of a motor-car is made of laminated glass.

It is one object of the present invention to provide a method whereby this information may be obtained by a simple and rapid test which can be carried out without injuring the material to which it is applied and it is a further object of the invention to provide simple but robust apparatus for carrying out the examination.

The present invention accordingly comprises a method of examining a sheet or the like of transparent material for homogeneity which comprises directing a beam of light through a surface of the material at an angle inclined to the normal and viewing the light which emerges from the said surface after reflection within the material.

When the sheet or the like which is examined consists e. g. of two glass sheets and an interposed layer of strengthening material, such as cellulose acetate or a synthetic resin, reflection takes place at each surface of the interlayer and at the two outer glass surfaces and the emergent light beam is found to consist of four images. The images from the two surfaces of the interlayer may be so close together as to appear twinned.

The beam must approach the sheet or the like of transparent material at as large an angle of incidence as possible in order that visible separation of the various images may take place and in order that the angle of incidence may be a maximum the incident and emergent light may be passed through a block or prism of transparent material which is maintained in optical contact with the sheet or the like to be examined by means of an interposed film of a liquid whose refractive index is of the same order as that of the block. When the transparent block and the material to be examined consist of glass the liquid employed to secure optical contact between the two may consist of dimethyl phthalate, ethyl salicylate or liquid paraffin. In the absence of a block or prism, the angle of incidence of the light beam upon the second surface (in the case of a composite material) cannot exceed the critical angle between the material of which the first layer is made and air.

The underside of the transparent sheet or the like to be examined may be coated e. g. with a coloured transparent lacquer, an opaque paint or enamel, e. g. black paint, or a film of opaque material, e. g. black gummed paper, in order to absorb a large proportion of light which falls upon the lower inside surface of the transparent sheet. The image from this surface is far brighter than any of the others and dazzles the observer if it is not reduced in brilliance. When a coloured lacquer is used, the light image reflected from that surface is coloured and hence distinguishable from the light images from the other surfaces.

The invention further includes apparatus for carrying out the method described above which comprises means for maintaining a source of light in such relation to the transparent material to be examined that a beam of light is passed into the material at an angle inclined to the normal and means for viewing the emergent light.

The source of illumination and the viewing means may conveniently be arranged so that the angles they make with the surface of the material to be examined may be adjusted.

The incident beam of light is preferably small and may consist of parallel rays and for this purpose the source of light may be provided with a variable slit and lens system.

One convenient form of apparatus embodies a rhomboidal prism, for example a prism having an angle of 60° and such an arrangement enables the test to be carried out with minimum adjustment of the components of the apparatus. In employing such apparatus in the examination of a sheet or block of glass the prism is maintained in optical contact with the surface of the material to be examined by means of a film of dimethyl phthalate, ethyl salicylate or liquid paraffin. The incident beam of light is passed into that face of the prism inclined at an acute angle to the surface of the material to be examined and the emergent beam is viewed (after internal reflection at the inclined face of the prism adjacent to the obtuse angle) in a general direction normal to the surface of the material. It is desirable that the incident beam should pass through the inclined face of the prism normal to that face in order that the amount of light lost by reflection and refraction may be reduced to a minimum.

The light beam may consist of monochromatic light if colouring of the emergent beam by refraction is to be prevented.

The emergent beam may be projected into a viewing tube (which may be provided with a suitable lens system) or it may be projected upon a translucent screen for example a ground glass plate. Provision may be made for altering the angle at which the incident beam reaches the prism in order that the images may be brought into the centre of the field of view in the viewing tube irrespective of the refractive index of the material being tested.

Following is a description by way of example and with reference to the accompanying drawing of one form of apparatus constructed in accordance with the present invention and adapted to test glass, say up to ¼ inch in thickness.

In the drawing:

Figure 1 is a side view of the apparatus (with the side plate removed);

Figure 2 shows in diagrammatic form the path of the light rays in the apparatus;

Figure 3 shows (enlarged four times) the appearance of the images when viewing a sheet of laminated glass, and Figure 4 shows on the same scale as Figure 3 the appearance when viewing a homogeneous sheet of glass.

Similar reference numerals in Figures 1 and 2 refer to similar parts.

*Example*

Referring to Figure 1 casing 11 has mounted within it an electric lamp 12 the lower end of which is provided e. g. with an adjustable slit and lens system for giving a small intense beam of parallel light. The lamp is mounted on a carrier 13 which is capable of adjustment by means of the knurled screw 14 at its upper end. A rhomboidal prism 15 which has an acute angle of 60° is arranged so that the face 16 adjacent to the acute angle projects through the bottom of the casing 11 and so that the beam of light from the lamp 12 enters the face 17 of the prism at an angle which is substantially normal to that face. The prism may have a base 2 inches by ¾ inch and a height of 1 inch. A larger prism will be required if sheets thicker than say ¼ inch are to be examined. 18 is a plain sight tube (which may be provided with a translucent screen) arranged normal to the upper face 19 of the prism to direct the eye to the images of the incident light after reflection and to cut off unwanted light so that the images may be viewed readily. The tube may be made adjustable if desired. The lamp is connected through a lead 20 and switch 21 (operated by a knob on the far side of the apparatus) to a battery 22 (e. g. a standard 3 volt battery). 23 and 24 are retaining members for a spring clip (not shown) which, when the apparatus is not in use, is employed to protect the exposed face 16 of the prism 15 from damage.

The examination of a sheet of glass is carried out by taking approximately two square inches of black gummed paper, wetting it thoroughly by immersing it completely in water and placing it on one surface of the sheet of glass making sure that there are no bubbles of air between the glass and the paper. There are placed on the surface of the sheet of glass immediately opposite to the paper two or three drops of a liquid whose refractive index does not lie too far from that of glass, e. g. dimethyl phthalate, ethyl salicylate or liquid paraffin and the lower face of the prism is brought into contact with the liquid so as to form a uniform film of liquid between the prism and the glass surface (as in Figure 2).

When the test is to be carried out on the windscreen of a motor-car it is normally more convenient to apply the gummed paper to that surface of the screen facing the inside of the car and after placing the prism in position on the opposite surface of the screen to allow several drops of the liquid used for establishing optical contact between the prism and the surface of the glass to flow between the contacting surfaces.

The light is switched on and the position of the lamp adjusted by turning the knurled screw 14 until all the reflected images (as seen down the sight tube 18) lie well within the field of vision. On looking down the sight tube, spots of light are seen against a dark background. When the sheet under examination consists of two or more laminations or when it is non-homogeneous due to the presence of seed or cord in the glass, the emergent beam exhibits more than two images. Thus, in the case of safety glass consisting of two sheets of glass with an interposed strengthening layer, (as shown in Figure 2) the emergent beam consists of one image 25 from the upper glass surface 26 (of Figure 2), another image 27 from the bottom glass surface 28 and two intermediate images 29 and 30, which may be so close together as to appear twinned, one (29) from the upper face of the interlayer and the other (30) from the lower face.

The emergent beam after leaving the sheet under examination is internally reflected at the inclined face of the prism opposite to that through which the light entered and thence passes through the upper face 19 of the prism to the sight tube 18.

When plain glass (or toughened glass) is examined the centre twin image (29, 30) is absent and only two spots 25 and 27 can be seen as shown in Figure 4.

The spots of light are not of uniform intensity since the filament of the electric lamp forms a bright image running across each of the spots.

It will be understood that the present invention may be employed not only for the examination of laminated glass but for the examination of composite films or of transparent synthetic material.

We claim:

1. Apparatus for examining a sheet of transparent material for homogeneity throughout its thickness which apparatus comprises in combination a casing, a rhomboidal glass prism one face of which projects through the casing so that it can be brought into contact with a surface of the sheet to be examined, an electric lamp mounted within the casing and arranged to pass a parallel beam of light normally into that face of the prism which is at an acute angle to the face adapted to contact with the sheet to be examined, a viewing tube entering said casing and arranged normal to that face of the prism which is parallel to the face adapted to contact with the sheet to be examined to view the beam of light emerging from the said sheet after reflection therein and after internal reflection at that face of the prism parallel with the face through which the incident light enters and means for moving the source of light relatively to the prism in order to adjust the position of the emergent beam of light within the viewing tube.

2. Apparatus for examining a sheet of transparent material for homogeneity throughout its thickness which apparatus comprises in combination a casing, a rhomboidal glass prism of which the acute angles are of the order of 60° mounted inside the casing but having one face projecting from the casing and adapted to be brought into contact with a surface of the sheet to be examined, an electric lamp mounted in the casing adapted to pass a narrow beam of light normally into that face of the prism which is at an angle of approximately 60° to the face projecting from the casing and a viewing tube carried by the casing arranged normally to that face of the prism which is parallel to the face projecting from the casing, the arrangement being such that portions of the light passing through the prism from the lamp are reflected back into the prism in at least partly separated relationship from the surface of the sheet against the prism, from the opposite surface of the sheet and from any internal surfaces of the sheet at which a change in the refractive index occurs, the several reflected portions of the beam then being internally reflected in the prism at that face thereof which is parallel with the face through which the incident light enters and emerging from the prism into the viewing tube.

3. Apparatus for examing a sheet of transparent material for homogeneity throughout its thickness which apparatus comprises a casing, a rhomboidal glass prism of which the acute angles are of the order of 60° mounted inside the casing but having one face projecting from the casing and adapted to be brought into contact with the surface of the sheet to be examined, a source of monochromatic light adjustable so as to pass a narrow beam of light normally into that face of the prism which is at an angle of approximately 60° to the face projecting from the casing and a viewing tube carried by the casing provided with translucent screen and extending normally to that face of the prism which is parallel to the face projecting from the casing, the arrangement of the apparatus being such that portions of the light passing through the prism from the lamp are reflected back into the prism in at least partly separated relationship from the surface of the sheet against the prism, from the opposite surface of the sheet and from any internal surfaces of the sheet at which a change in the refractive index occurs, the several reflected portions of the beam then being internally reflected in the prism at that face thereof which is parallel with the face through which the incident light enters and emerging from the prism into the viewing tube.

4. A method of examining a sheet of transparent material for homogeneity throughout its thickness, which method comprises placing in optical contact with one surface of the sheet to be examined, the base side of a prism, having end sides at acute and obtuse angles, respectively, to the said base side, directing a beam of light onto and through the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

5. A method of examining a sheet of transparent material for homogeneity throughout its thickness, which method comprises placing in optical contact with one surface of the sheet to be examined, the base side of a rhomboidal prism, directing a beam of substantially parallel light onto and through the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

6. A method of examining a sheet of transparent material for homogeneity throughout its thickness, which method comprises placing in contact with one surface of the sheet to be examined, the base side of a prism, having end sides at acute and obtuse angles, respectively, to the said base side, with a film of a liquid which is without solvent action on the prism and on the sheet and which has a refractive index of the same order as that of the prism interposed between the contacting surfaces of the prism and the sheet to obtain optical contact between these surfaces, directing a beam of light onto the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

7. A method of examining a sheet of transparent material for homogeneity, which method comprises placing in contact with one surface of the sheet to be examined, the base side of a prism, having end sides at acute and obtuse angles, respectively, to the said base side, with a film of dimethyl phthalate interposed between the contacting faces of the prism and the sheet to obtain optical contact between these faces, directing a beam of light onto and through the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet, and examining the light which emerges from the prism to determine whether it has been divided into more than two portions and therefore whether any portion of the light has been reflected from an internal surface of the sheet as aforesaid.

8. A method of examining a sheet of transparent material for homogeneity throughout its thickness, which method comprises placing in optical contact with one surface of the sheet to be examined, the base side of a prism, having end sides at acute and obtuse angles, respectively, to the said base side, applying to the opposite surface of the sheet at a position corresponding to that of the prism a coating of a substance which will, by absorption of a part of light reaching that surface through the sheet, reduce the amount of the light reflected from the surface, directing a beam of light onto the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

9. A method of examining a sheet of transparent material for homogeneity throughout its thickness, which method comprises placing in optical contact with one surface of the sheet to be examined, the base side of a prism, having end sides at acute and obtuse angles, respectively, to the said base side, applying by adhesive to the opposite surface of the sheet at a position corresponding to that of the prism, a film of black paper, directing a beam of light onto the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

10. Apparatus for examining a sheet of transparent material for homogeneity throughout its thickness, which apparatus comprises in combination a support, a prism of transparent material carried on the support having a base side and end sides at acute and obtuse angles, respectively, and so placed in relation to the support that the base side of the prism can be placed in optical contact with a surface of the sheet to be examined, an electric lamp carried on the support and arranged to direct a narrow beam of light into the side of the prism which makes an acute angle with the base side, the angle of the prism and position of the lamp being such that when the prism is in position on the sheet the light so directed will strike the sheet at an angle of incidence greater than that which would produce total reflection from portions of the sheet not covered by the apparatus and will be reflected back into the prism in at least partly separated relationship from the surface of the sheet against the prism, from the opposite surface of the sheet and from any internal surfaces of the sheet at which a change in the refractive index occurs and such that the several reflected portions of the beam will then be internally reflected in the prism at said side thereof making an obtuse angle with the base side, so that the light leaves the prism at an angle, in relation to the sheet, greater than the angle of incidence of the light on the sheet, and a viewing tube carried on the support and so directed towards the prism that the light leaving the prism may be examined through the tube to determine whether it has been divided into more than two portions and therefore whether any portion of the light has been reflected from an internal surface of the sheet as aforesaid.

11. Apparatus for examining a sheet of transparent material for homogeneity throughout its thickness, which apparatus comprises in combination a casing, a rhomboidal prism of transparent material mounted inside the casing but having the base side projecting from the casing and adapted to be brought into contact with a surface of the sheet to be examined, an electric lamp mounted in the casing adapted to pass a narrow beam of light normally into that side of the prism which is at an acute angle to the base side, and a viewing tube carried by the casing arranged normally to that side of the prism which is parallel to the base side, the angle of the prism and position of the lamp being such that the light passing through the prism from the lamp will strike the sheet at an angle of incidence greater than that which would produce total reflection from portions of the sheet not covered by the apparatus and will be reflected back into the prism in at least partly separated relationship from the surface of the sheet against the prism, from the opposite surface of the sheet and from any internal surfaces of the sheet at which a change in the refractive index occurs, the several reflected portions of the beam being then internally reflected in the prism at the side thereof which is parallel with the side at an acute angle to the base side and emerging from the prism into the viewing tube.

12. A method of examining a sheet of transparent material for homogeneity, which method comprises placing in contact with one surface of the sheet to be examined, the base side of a prism, having end sides at acute and obtuse angles, respectively, to the said base side, with a film of ethyl salicylate interposed between the contacting faces of the prism and the sheet to obtain optical contact between these faces, directing a beam of light onto and through the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

13. A method of examining a sheet of transparent material for homogeneity, which method comprises placing in contact with one surface of the sheet to be examined, the base side of a prism, having end sides at acute and obtuse angles, respectively, to the said base side, with a film of liquid paraffin interposed between the contacting faces of the prism and the sheet to obtain optical contact between these faces, directing a beam of light onto and through the side of the prism which makes an acute angle with the base side, through said base side of the prism and onto the sheet of transparent material at an angle of incidence greater than that which would produce total reflection if the prism were removed, and under conditions so selected that portions of the beam are reflected back into the prism in at least partly separated relationship from the adjacent surface of the sheet, from the opposite surface of the sheet and from any internal surface of the sheet at which a change in the refractive index occurs, the several reflected portions of the beam then being internally reflected in the prism at said side thereof making an obtuse angle with the base side so that the light leaves the prism at an angle, in relation to the sheet, greater than the angle of incidence of the light on the sheet and examining the light which emerges from the prism to determine whether it has been divided into more than two portions and therefore whether any portion of the light has been reflected from an internal surface of the sheet as aforesaid.

ALLAN COLEY WAINE.
FAZUL DIN.